(12) United States Patent
Myren et al.

(10) Patent No.: US 9,652,989 B1
(45) Date of Patent: May 16, 2017

(54) INTEGRATION AND DISPLAY OF SYMBOLOGY AND GRAPHICAL FLIGHT PLANNING IN A FLIGHT MANAGEMENT SYSTEM

(71) Applicant: Rockwell Collins, Inc., Cedar Rapids, IA (US)

(72) Inventors: Jason A. Myren, Marion, IA (US); Christina M. Martinez, Rio Rancho, NM (US); Benjamin M. Helppi, Anamosa, IA (US); Douglas M. McCormick, North Liberty, IA (US); Evie R. Johnson, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 7 days.

(21) Appl. No.: 14/584,807

(22) Filed: Dec. 29, 2014

(51) Int. Cl.
  *G06F 19/00* (2011.01)
  *G06G 7/70* (2006.01)
  *G06G 7/76* (2006.01)
  *G08G 5/00* (2006.01)
  *B64D 43/00* (2006.01)

(52) U.S. Cl.
  CPC ............ *G08G 5/003* (2013.01); *B64D 43/00* (2013.01)

(58) Field of Classification Search
  CPC .. G08G 5/0013; G08G 5/0043; G08G 5/0082; G08G 5/0026; G08G 5/065
  USPC .......................................................... 701/120
  See application file for complete search history.

(56) References Cited

U.S. PATENT DOCUMENTS

| | | | |
|---|---|---|---|
| 8,744,760 B1 * | 6/2014 | Mishmash | G01C 23/005 701/454 |
| 2010/0030401 A1 * | 2/2010 | Rogers | G01C 23/00 701/3 |

* cited by examiner

*Primary Examiner* — Maceeh Anwari
(74) *Attorney, Agent, or Firm* — Angel N. Gerdzhikov; Donna P. Suchy; Daniel M. Barbieri (57) ABSTRACT

Methods and systems for integration of symbology and flight planning information in a flight management system are disclosed. A method may include: receiving a portion of a flight plan from an auxiliary flight management system; receiving graphical data for the portion of the flight plan from the auxiliary flight management system; integrating the portion of the flight plan received from the auxiliary flight management system into at least one additional portion of the flight plan managed by a primary flight management system to produce an integrated flight plan; and displaying the integrated flight plan to a user, wherein the portion of the flight plan received from the auxiliary flight management system is displayed at least partially based on the graphical data for the portion of the flight plan received from the auxiliary flight management system.

19 Claims, 10 Drawing Sheets

INTEGRATION AND DISPLAY OF SYMBOLOGY AND GRAPHICAL FLIGHT PLANNING IN A FLIGHT MANAGEMENT SYSTEM

BACKGROUND

A flight management system (FMS) is a component of an aircraft's avionics. A primary function of a flight management system is management and execution of a flight plan. Different types of flight management systems may be utilized to carry out different types of operations. For instance, a civil flight management system may be certified and utilized for civilian aircrafts, while a mission-specific flight management system may be designed specifically for carrying out certain missions such as search and rescue, military, or other tactical operations.

SUMMARY

Embodiments of the inventive concepts disclosed herein are directed to a method. The method may include: receiving a portion of a flight plan from an auxiliary flight management system; receiving graphical data for the portion of the flight plan from the auxiliary flight management system; integrating the portion of the flight plan received from the auxiliary flight management system into at least one additional portion of the flight plan managed by a primary flight management system to produce an integrated flight plan; and displaying the integrated flight plan to a user, wherein the portion of the flight plan received from the auxiliary flight management system is displayed at least partially based on the graphical data for the portion of the flight plan received from the auxiliary flight management system.

In one aspect, embodiments of the inventive concepts disclosed herein are directed to an apparatus. The apparatus may include an application programming interface configured to receive a portion of a flight plan and graphical data for the portion of the flight plan from an auxiliary flight management system. The apparatus may also include a processor configured to: integrate the portion of the flight plan received from the auxiliary flight management system into at least one additional portion of the flight plan managed by a primary flight management system to produce an integrated flight plan; and provide the integrated flight plan for display to a user, wherein the portion of the flight plan received from the auxiliary flight management system is displayed at least partially based on the graphical data for the portion of the flight plan received from the auxiliary flight management system.

In a further aspect, embodiments of the inventive concepts disclosed herein are directed to a system. The system may include a display, an auxiliary flight management system, and a primary flight management system in communication with the display and the auxiliary flight management system. The primary flight management system may be configured to: receive a portion of a flight plan and graphical data for the portion of the flight plan from the auxiliary flight management system; integrate the portion of the flight plan received from the auxiliary flight management system into at least one additional portion of the flight plan managed by the primary flight management system to produce an integrated flight plan; and provide the integrated flight plan for display to a user, wherein the portion of the flight plan received from the auxiliary flight management system is displayed at least partially based on the graphical data for the portion of the flight plan received from the auxiliary flight management system.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, which are illustrated in the accompanying drawings.

Figure 1:
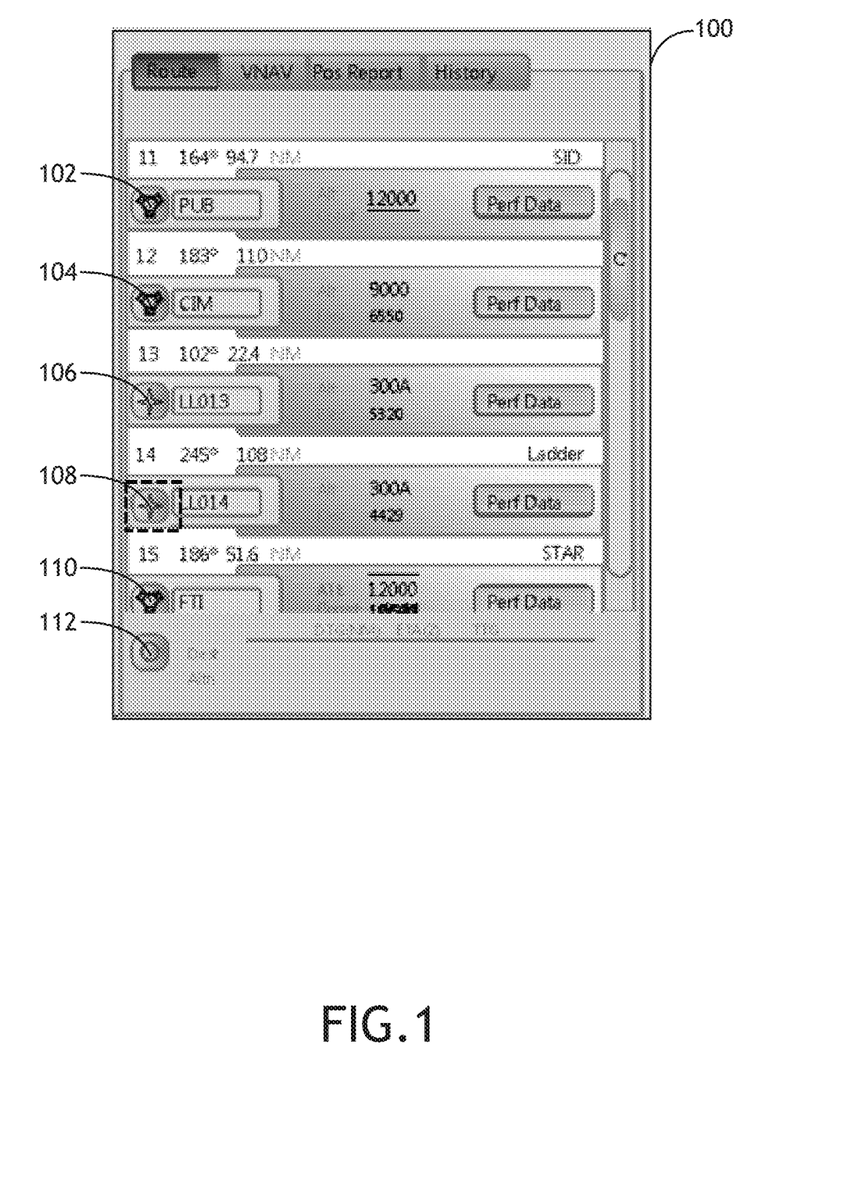
FIG. 1 is an illustration depicting an exemplary interface for presenting a flight plan to a user.

Referring to FIG. 1, an illustration depicting an exemplary interface 100 for presenting a flight plan to a user (e.g., a pilot) is shown. A flight plan typically includes a sequence of legs that an aircraft is instructed to follow one after another. The legs are typically established utilizing a plurality of leg terminators. A partial listing of such leg terminators 102 through 112 are shown in FIG. 1 for illustrative purposes. It is noted that the leg terminators 102 through 112 may include waypoints 106 and 108, as well as other types of navigational points 102, 104 and 110.

It is also noted that a symbol may be associated with each leg terminator 102 through 112 to provide a visual indicator to the user. For instance, in the example depicted in FIG. 1, waypoint symbols are associated with waypoints 106 and 108, navigational aid (or navaid) symbols are associated with points 102, 104 and 110, and an airport symbol is associated with a destination airport 112. In general, a flight management system may access a definition file that contains a library of commonly used symbols. The flight management system may select an appropriate symbol from the definition file and associate the selected symbol with a particular leg terminator based on the specific type of that particular leg terminator.

In certain situations, however, the symbols provided by the definition file may not be the most informative symbols for certain leg terminators. For example, suppose the flight management system is a civil flight management system (may be referred to as the Civil FMS) certified for civilian aircrafts, wherein the Civil FMS has access to a definition file that contains a library of commonly used symbols for civil aviation. Further, suppose that an aircraft equipped with such a Civil FMS is directed to participate in a mission that may be considered outside of civil aviation activities, such as a search and rescue mission. Relating to the example shown in FIG. 1, suppose that the legs leading up to the leg terminator 108 are utilized to direct the aircraft to the starting point of a search area. The aircraft then enters the search area at the leg terminator 108 and exits the search area at the leg terminator 110. It may be desirable to associate a different symbol with the leg terminator 108 to indicate to the user that the leg terminator 108 is the starting point of the search mission. However, the definition file accessible to the Civil FMS may not have a definition for such a symbol.

In some embodiments, the Civil FMS may be responsible for the overall flight plan, but may delegate certain responsibilities to a mission-specific auxiliary (third party) system. For instance, a mission-specific auxiliary flight management system (may be referred to as the Mission FMS) may be responsible for management of a portion of the flight plan within the search area. Relating again to the example shown in FIG. 1, the Mission FMS may be responsible for planning the leg between the leg terminator 108 and the leg terminator 110. The Mission FMS may define a ladder search pattern, a square search pattern, a circular search pattern, or other types of search patterns for this leg, and may subsequently insert this portion of the flight plan into the overall flight plan managed by the Civil FMS. It is contemplated that the Mission FMS may further specify a new symbol to be associated with the leg terminator 108.

Figure 2:
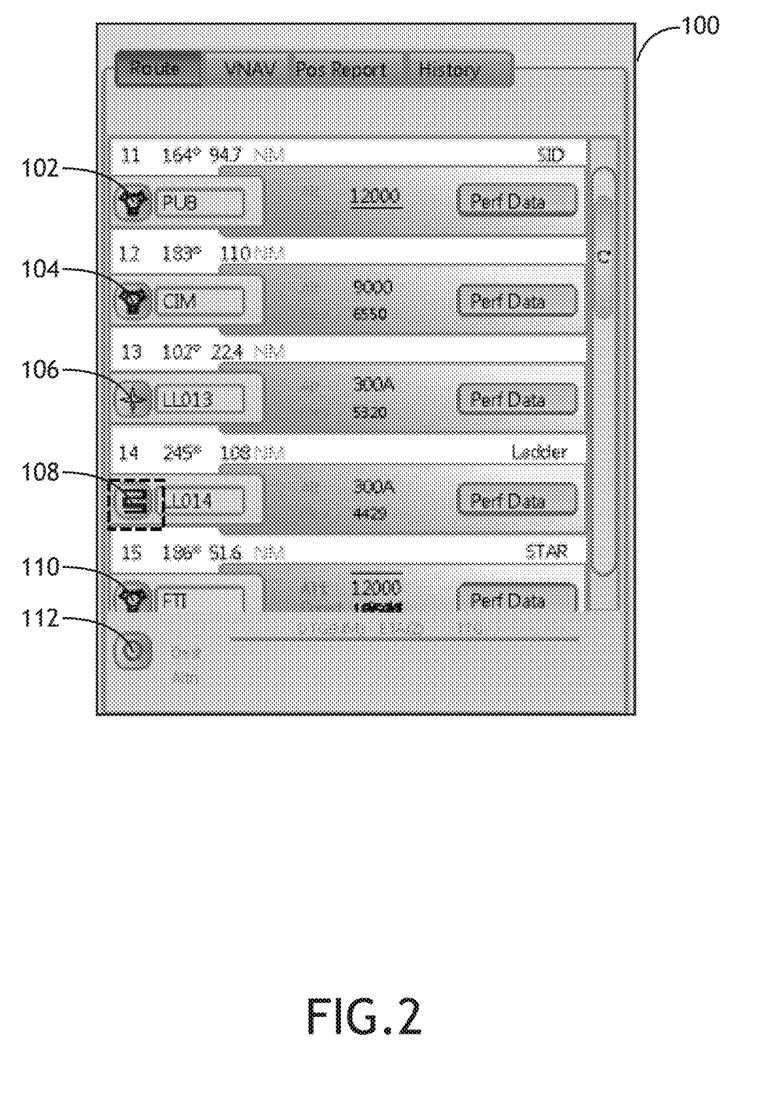
FIG. 2 is an illustration depicting an exemplary interface for presenting a flight plan to a user, wherein a third party symbol is associated with a particular leg terminator.

FIG. 2 is an illustration depicting a new symbol specified by the Mission FMS being associated with the leg terminator 108. It is noted that this new symbol may indicate not only the starting point of the search area, but also the type of search pattern (e.g., a ladder pattern) that is to be carried out upon entering the leg starting at the leg terminator 108, making the symbol associated with the leg terminator 108 more informative than the waypoint symbol shown in FIG. 1.

It is contemplated that the new symbol shown in FIG. 2 is merely exemplary. Symbols indicating a square search pattern, a circular search pattern, or other types of search patterns may be utilized without departing from the broad scope of the inventive concepts disclosed herein. It is also contemplated that the auxiliary flight management system referenced above is not limited to handling only search and rescue missions. In accordance with some embodiments of the inventive concepts disclosed herein, any auxiliary flight management system may be configured to specify symbols without any knowledge of the primary flight management system, and the primary flight management system may be instructed by the auxiliary flight management system to display such symbols accordingly.

In some embodiments, the instruction from the auxiliary flight management system may be provided in the form of a tag (e.g., data field) that can be associated with each leg the auxiliary flight management system handles. A tag may include a system identifier (e.g., a text string or a binary value) that identifies the auxiliary flight management system. The tag may also include a symbol identifier (e.g., a text string or a binary value) that identifies a specific symbol to be associated with a specific leg. Upon receiving the leg inserted by the auxiliary flight management system, the primary flight management system may access a supplemental definition file that contains symbol definitions for the identified auxiliary flight management system and select a particular symbol to be associated with the inserted leg based on the symbol identifier.

Figure 3:
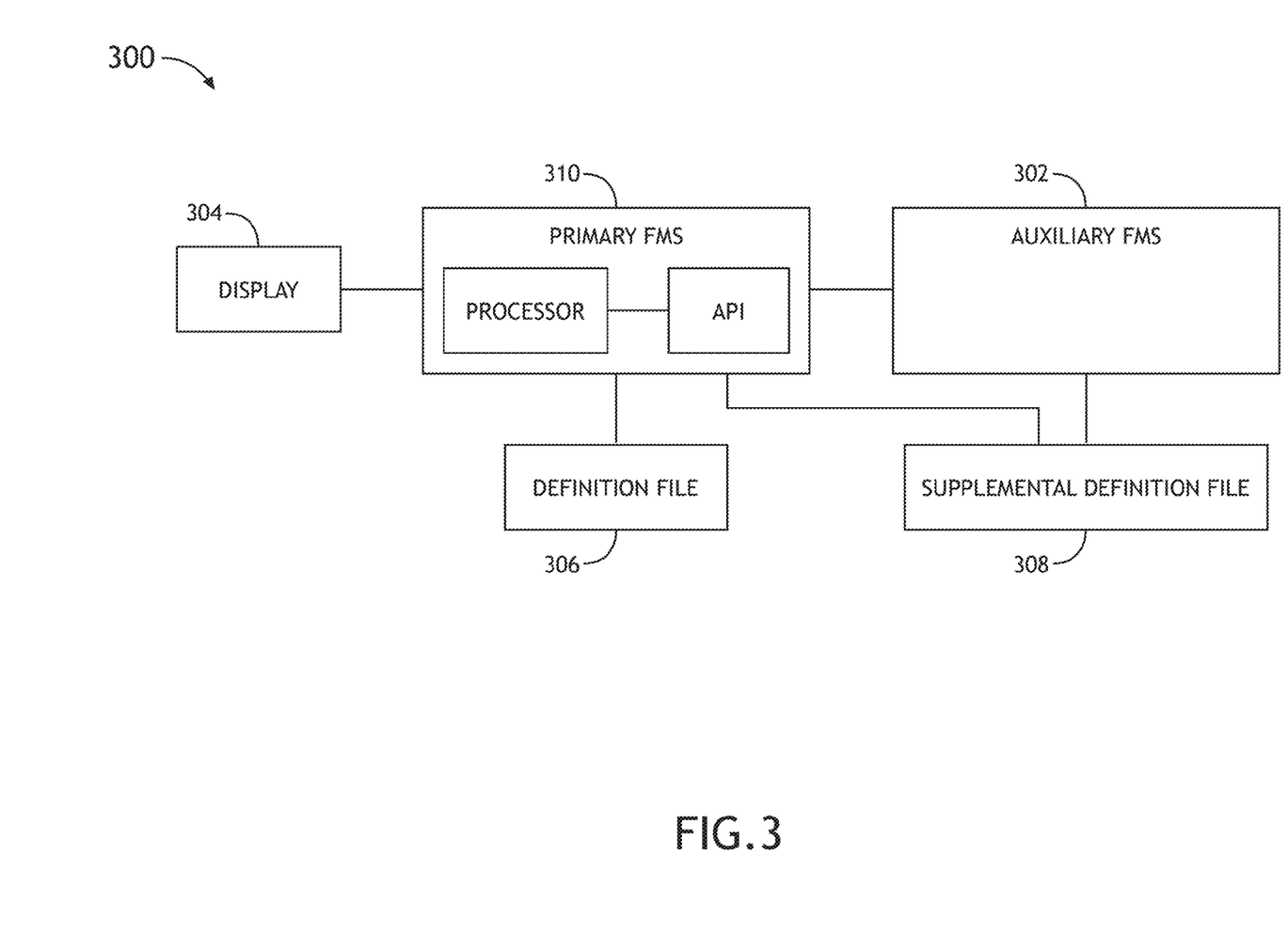
FIG. 3 is a block diagram depicting an embodiment of a system that supports integration of third party symbology and graphical flight planning in a flight management system.

FIG. 3 is a block diagram depicting an embodiment of a system 300 that includes a primary flight management system 310, an auxiliary flight management system 302, and a display system 304. The primary flight management system 310 may include at least one processor 312 for carrying out the functions of flight management. The primary flight management system 310 may have access to a definition file 306. The definition file 306 may contain definitions utilized by the primary flight management system 310 as previously described. In addition, the primary flight management system 310 may have access to a supplemental definition file 308. The supplemental definition file 308 may contain definitions provided by the auxiliary flight management system 302 that the primary flight management system 310 may utilize when instructed.

It is noted that in this configuration, the supplemental definition file 308 is managed separately and independently with respect to the definition file 306, allowing the supplemental definition file 308 to be modified independently with respect to the definition file 306, and vice versa. For example, the definition file 306 may be updated, or may remain unmodified, based on the specific needs of the primary flight management system 310, without affecting the supplemental definition file 308. The primary flight management system 310 does not need to have any direct knowledge of any third party symbols utilized by any auxiliary flight management system(s) 302. These third party symbols may be specified, maintained, or modified by the auxiliary flight management system(s) 302 without altering the primary flight management system 310 and its definition file 306.

It is to be understood that the definition files 306 and 308 may be stored in a text file, a binary file, a database, a memory, or various other types of data storage devices accessible to the flight management systems, as long as the supplemental definition file 308 can be modified independently with respect to the definition file 306. It is contemplated that in an event that the supplemental definition file 308 is inaccessible to the primary flight management system 310, or that the primary flight management system 310 is otherwise unable to retrieve a particular symbol from the supplemental definition file 308, the primary flight management system 310 may use a default symbol instead. For instance, in the example depicted above, if the primary flight management system 310 is unable to obtain the ladder symbol definition from the supplemental definition file 308, a waypoint symbol may be displayed for the leg terminator 108 by default.

It is contemplated that the system 300 depicted above is merely exemplary; the specific implementation of the separation of the definition file 306 and the supplemental definition file 308 may vary without departing from the broad scope of the inventive concepts disclosed herein.

It is also contemplated that the integration of the primary flight management system 310 and the auxiliary flight management system 302 is not limited to the integration of symbology as described above; graphical user interfaces provided by the primary flight management system 310 and the auxiliary flight management system 302 may also be integrated in accordance with embodiments of the inventive concepts disclosed herein.

Continuing with examples described above, wherein the primary flight management system (Civil FMS) may be responsible for the overall flight plan, while the specific planning within the search area may be handled by the auxiliary flight management system (Mission FMS). It is contemplated that an integrated user interface may be provided to facilitate the flight planning process utilizing both flight management systems.

Figure 4:
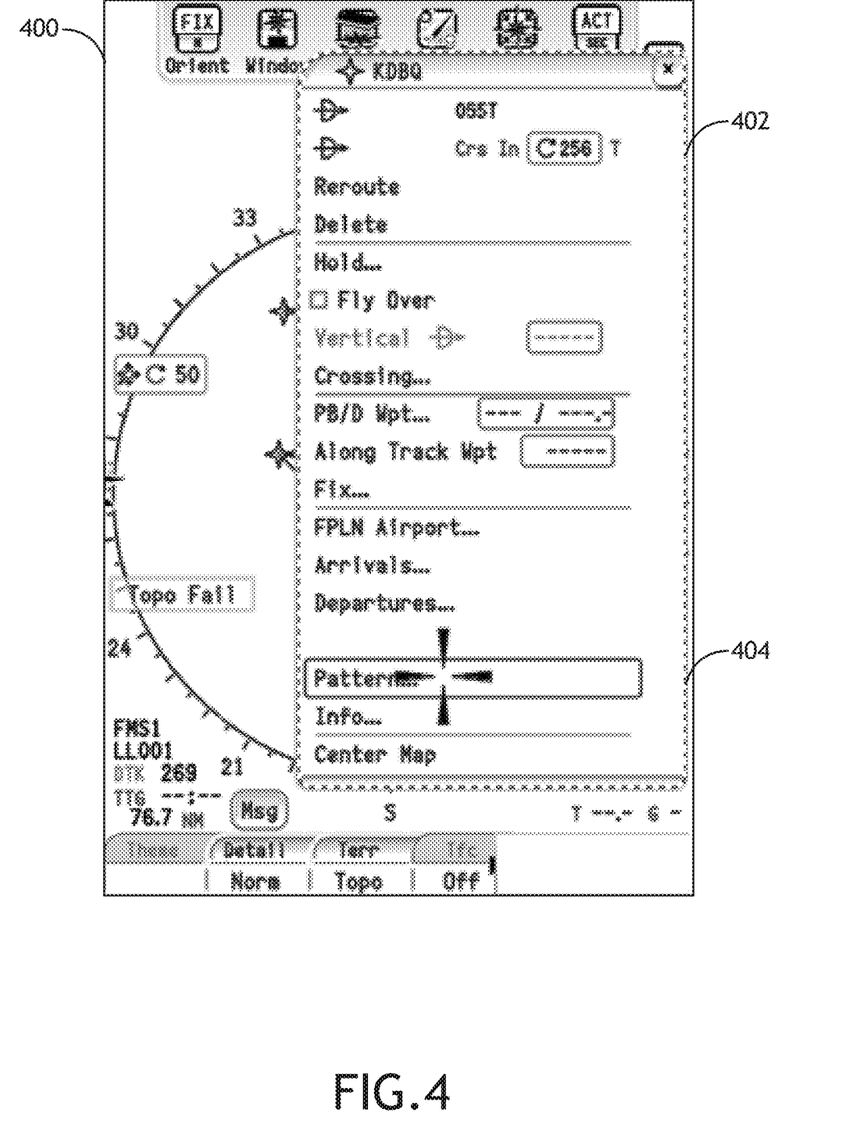
FIG. 4 is an illustration depicting an integrated interface containing menu items from both a primary flight management system and an auxiliary flight management system.
Figure 5:
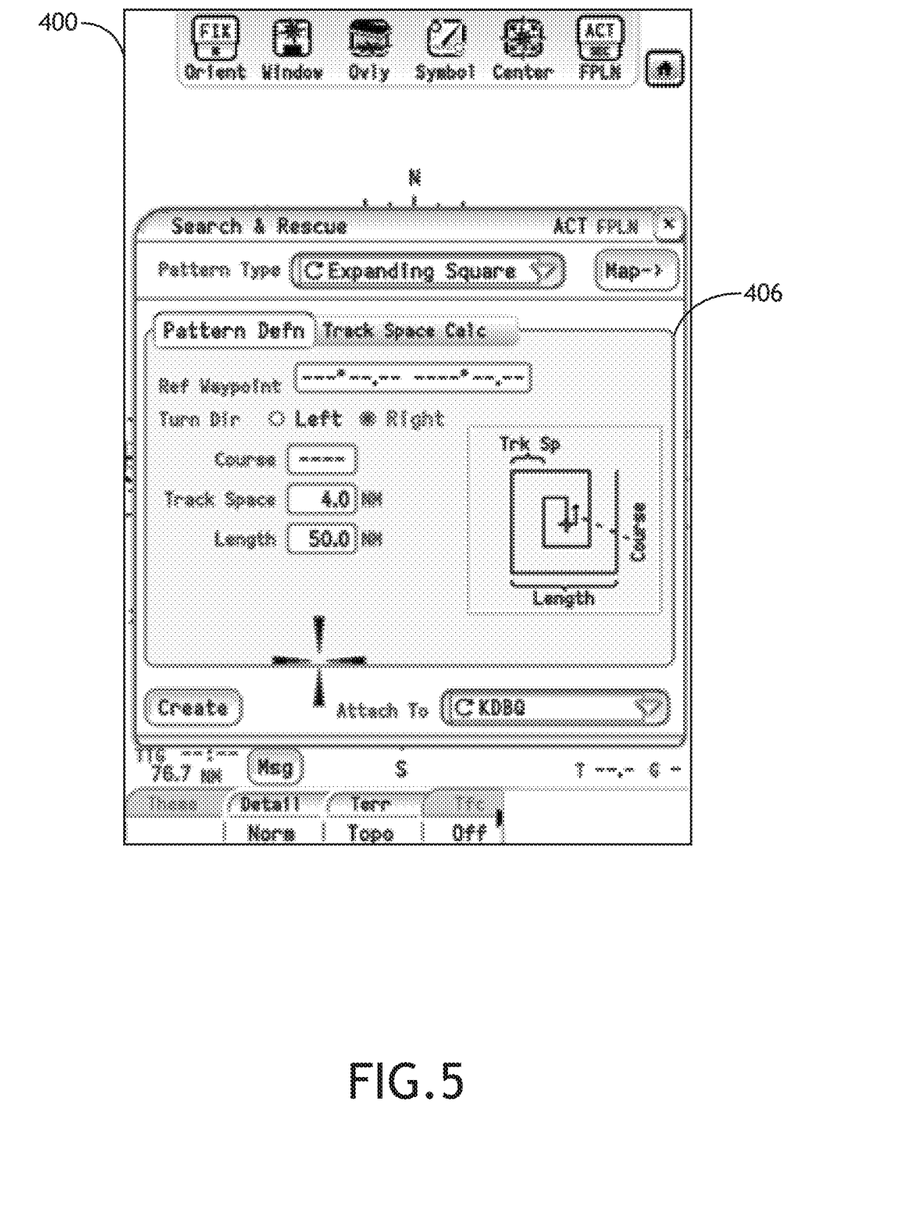
FIG. 5 is an illustration depicting an integrated interface containing a dialog box for an auxiliary flight management system.
Figure 6:
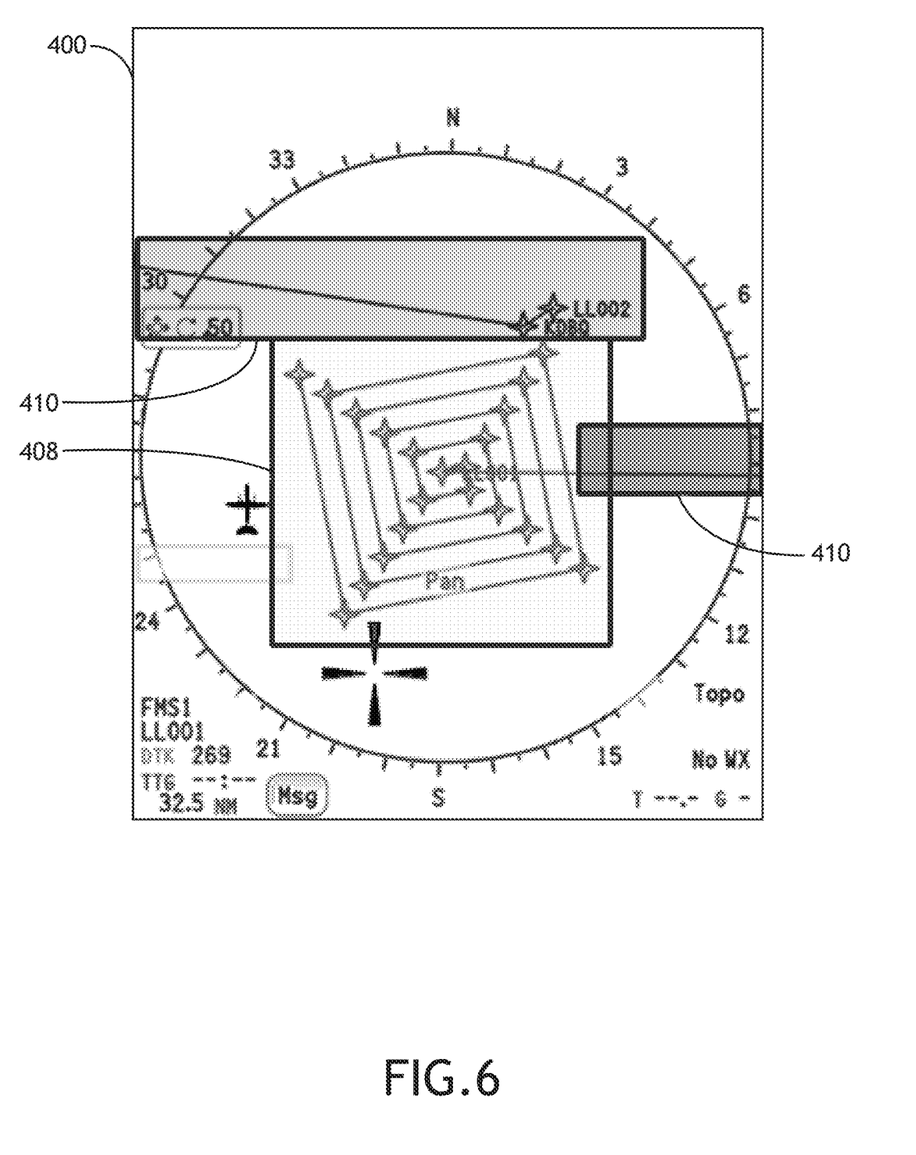
FIG. 6 is an illustration depicting an integrated interface containing a graphical representation of a portion of the flight plan generated by an auxiliary flight management system.

FIGS. 4 through 6 illustrate an embodiment of such an integrated user interface 400. A user may utilize the functions provided by a conventional Civil FMS to manage the overall flight plan. The user may also selectively engage the Mission FMS, and utilize the functions provided by the Mission FMS to create a specific search pattern within a search area. In some embodiments, the user may selectively engage the Mission FMS through a menu item 404 integrated within a dialog box (or a menu) 402.

Once engaged, the user may be presented with one or more additional dialog boxes 406 to interface with the Mission FMS and to facilitate the creation of a specific search pattern. For instance, the user may be prompted to specify the type of search pattern desired as well as various other search parameters. It is to be understood that specific techniques for creating search patterns are well studied and may vary without departing from the broad scope of the inventive concepts disclosed herein.

It is contemplated that a search pattern 408 created by the Mission FMS may be integrated (inserted) into the rest of a flight plan 410 managed by the Civil FMS and jointly presented to the user for visual verification as depicted in FIG. 6. Providing such a visual representation of the search pattern 408 in context with the rest of the flight plan 410 allows the user to visually determine whether sufficient coverage is provided for the intended area and efficiently identify any potential issues.

It is to be understood that while the search pattern 408 includes an expanding square pattern as shown in FIG. 6, the types of search patterns are not limited to expanding squares. Ladder search patterns, expanding square search patterns, expanding circular search patterns, or other types of search patterns may be integrated into the overall flight plan 410 in similar manners as described above without departing from the broad scope of the inventive concepts disclosed herein.

Figure 7:
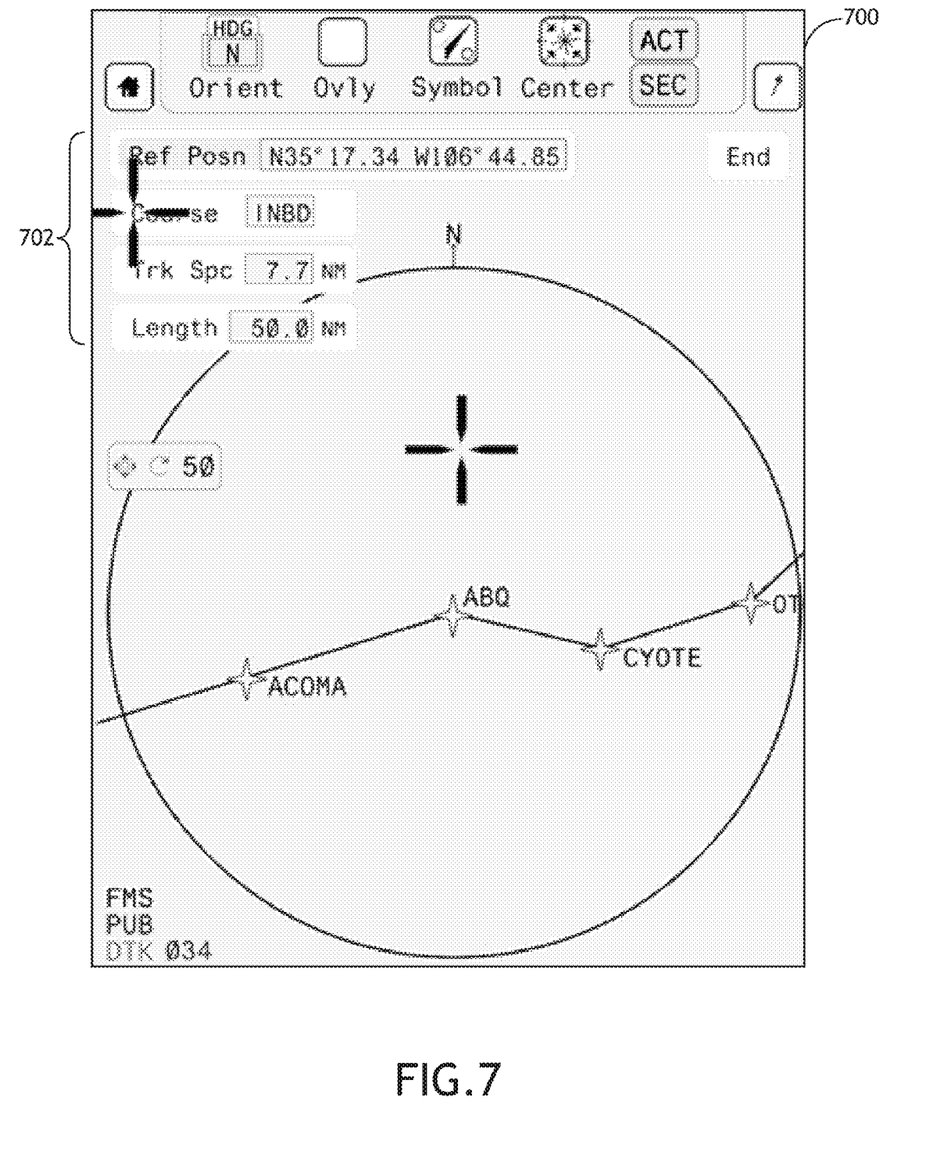
FIG. 7 is an illustration depicting an integrated interface containing a graphical user interface for interacting with an auxiliary flight management system.
Figure 8:
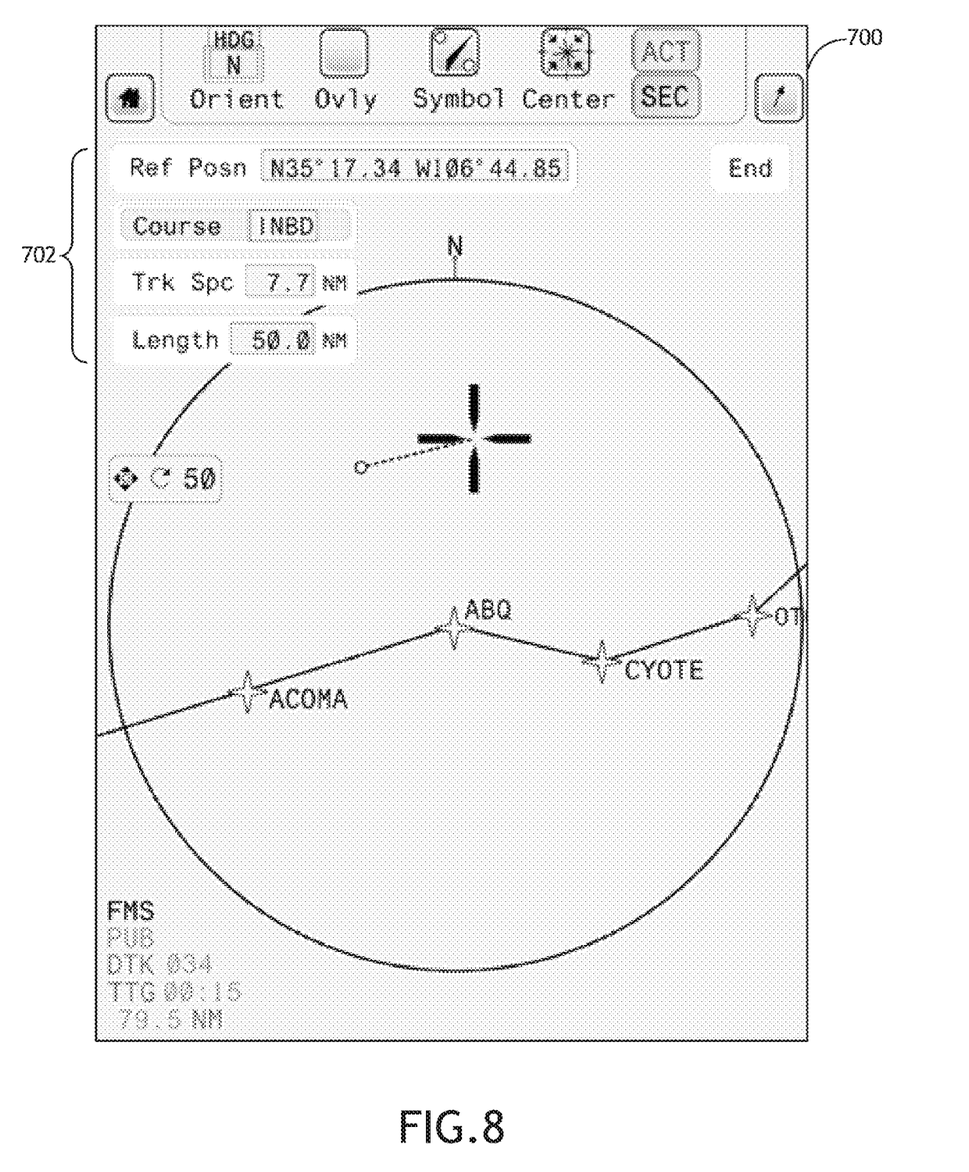
FIG. 8 is another illustration depicting an integrated interface containing a graphical user interface for interacting with an auxiliary flight management system.
Figure 9:
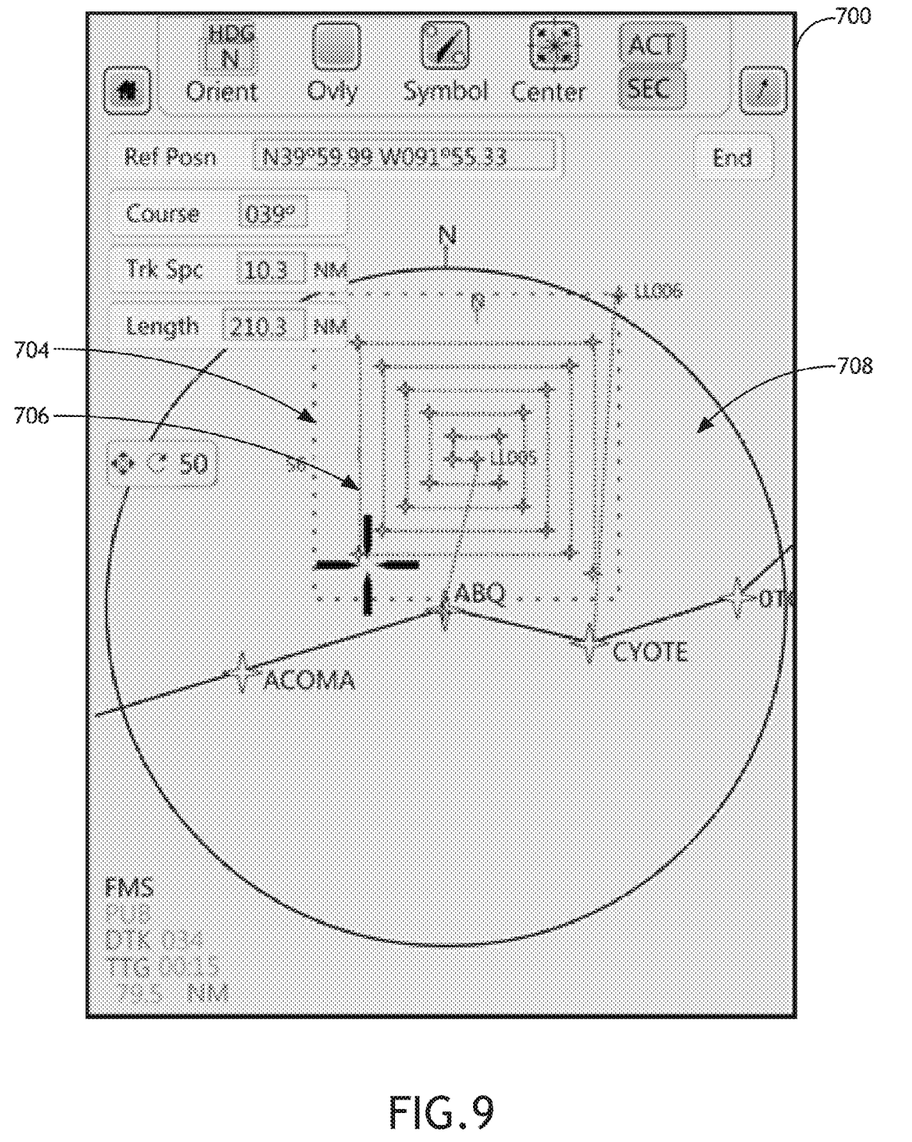
FIG. 9 is an illustration depicting an integrated interface containing a graphical representation of a portion of the flight plan generated by an auxiliary flight management system, wherein the graphical representation of the portion of the flight plan is displayed in a simplified preview representation.

It is also to be understood that while the dialog box 406 is shown as the interface for specifying the various search pattern parameters, additional and/or alternative user interfaces, such as an exemplary lateral map 700 shown in FIGS. 7 through 9, may be provided as well. For instance, the dialog box 406 and the lateral map 700 may be utilized jointly to provide a visualization of the pattern as it is being defined. For a display system that includes a single display, the dialog box 406 and the map 700 may be shown individually. For a display system that includes two or more displays, the dialog box 406 and the map 700 may be shown simultaneously, providing the user the flexibility to define the parameters using a combination of both text and/or graphical input methods. It is to be understood that the lateral map 700 and the user interface depicted herein are merely exemplary. Specific interfaces and dialog boxes may vary without departing from the broad scope of the inventive concepts disclosed herein.

In one embodiment, the lateral map 700 may include the display of the search pattern parameters 702, which may correspond to some of the search pattern parameters displayed in the dialog box 406. If the user chooses to configure a search pattern utilizing the lateral map 700, the user may first select the "reference position" button and specify a reference position on the lateral map 700. It is contemplated that the reference position may be received via a touch screen interface, a mouse input, a turn knob interface, as well as various other types of input devices without departing from the broad scope of the inventive concepts disclosed herein.

The user may also select the "course" button and specify the base position for the course. A marker (e.g., a circle) may be placed on the lateral map 700 to indicate the specified base position, as shown in FIG. 8. The user may then drag a cursor to a second position, and the course between the two points can be calculated and displayed in a parameters section 702 accordingly.

It is contemplated that the user may define the entire search pattern utilizing the lateral map 700. Alternatively and/or additionally, the user may specify the search parameters and let the Mission FMS generate a search pattern, which can then be previewed on the lateral map 700. It is noted that since large patterns may have several hundred waypoints in them, a simplified preview pattern may be displayed in certain situations.

FIG. 9 is an illustration depicting a simplified preview pattern 708. An outline 704 may indicate the general structure of the entire search pattern, while the tightly grouped dashed lines 706 may be utilized to show entry point, exit point, and a number of legs (e.g., the first twenty legs) of the pattern. It is to be understood that this simplified preview pattern 708 is merely exemplary. Certain implementations of the lateral map 700 may display fewer or more legs for preview purposes without departing from the broad scope of the inventive concepts disclosed herein. For instance, the user may be provided with an option to preview the entire pattern without simplification. It is contemplated that once the user determines that the preview of a particular search pattern is satisfactory, the user may commit to that search pattern, and that search pattern may be inserted into the flight plan as previously described.

It is also contemplated that providing the abilities to preview a search pattern helps increasing pilot awareness by providing a visual representation of the search pattern before execution, which in turn help reducing pilot error and workload in creating such patterns. It is further contemplated that the graphical planning method for creating a search pattern, as well as the abilities to compare and cross-reference textual entries and their corresponding visual representations may also be appreciated.

It is also noted that the integration of the Civil (or the primary) FMS and the Mission (or the auxiliary) FMS may be implemented in a manner that is consistent with the system 300 depicted in FIG. 3. In some embodiments, symbols, icons, and graphical indicators that are specific to the auxiliary flight management system 302 may be provided in the supplemental definition file 308, which is accessible to the primary flight management system 310. The primary flight management system 310 may also communicate directly with the auxiliary flight management system 302 via an interface 314 (e.g., an application programming interface, or API). However, it is noted that the primary flight management system 310 may not have any direct understanding of the specifics of the search pattern, which is the responsibility of the auxiliary flight management system 302. Furthermore, the auxiliary flight management system 302 may be utilized to attend to responsibilities such as providing drawings of the search pattern on the display 304. Alternatively/additionally, the auxiliary flight management system 302 may provide data regarding how to draw the search pattern to the primary flight management system 310, without having to explain to the primary flight management system 310 any specifics of the drawing itself. In other words, it is not necessary for the primary flight management system 310 to understand the search pattern generated by the auxiliary flight management system 302. It is noted that if the preview of the search pattern needs to include any symbols, icons, or indicators that are specific to the auxiliary flight management system 302, such symbols, icons, or indicators may be provided to the primary flight management system 310 utilizing the supplemental definition file 308 as previously described.

It is contemplated that the interface 314 not only facilitates communications between the primary and the auxiliary flight management systems 310 and 302, but also prohibits unauthorized access to the primary and the auxiliary flight management systems 310 and 302. Utilizing such an interface 314 in conjunction with supplemental definition file(s) 308, the primary flight management system 310 does not need to have any direct knowledge of the auxiliary flight management systems 302. The primary flight management system 310 may be able to function jointly with any auxiliary flight management system 302, as long as the auxiliary flight management system 302 supports the interface 314 utilized by the primary flight management system 310. It is further contemplated that the auxiliary flight management system 302 may be configured to carry out other types of missions in addition to search and rescue missions without departing from the broad scope of the inventive concepts disclosed herein.

Figure 10:
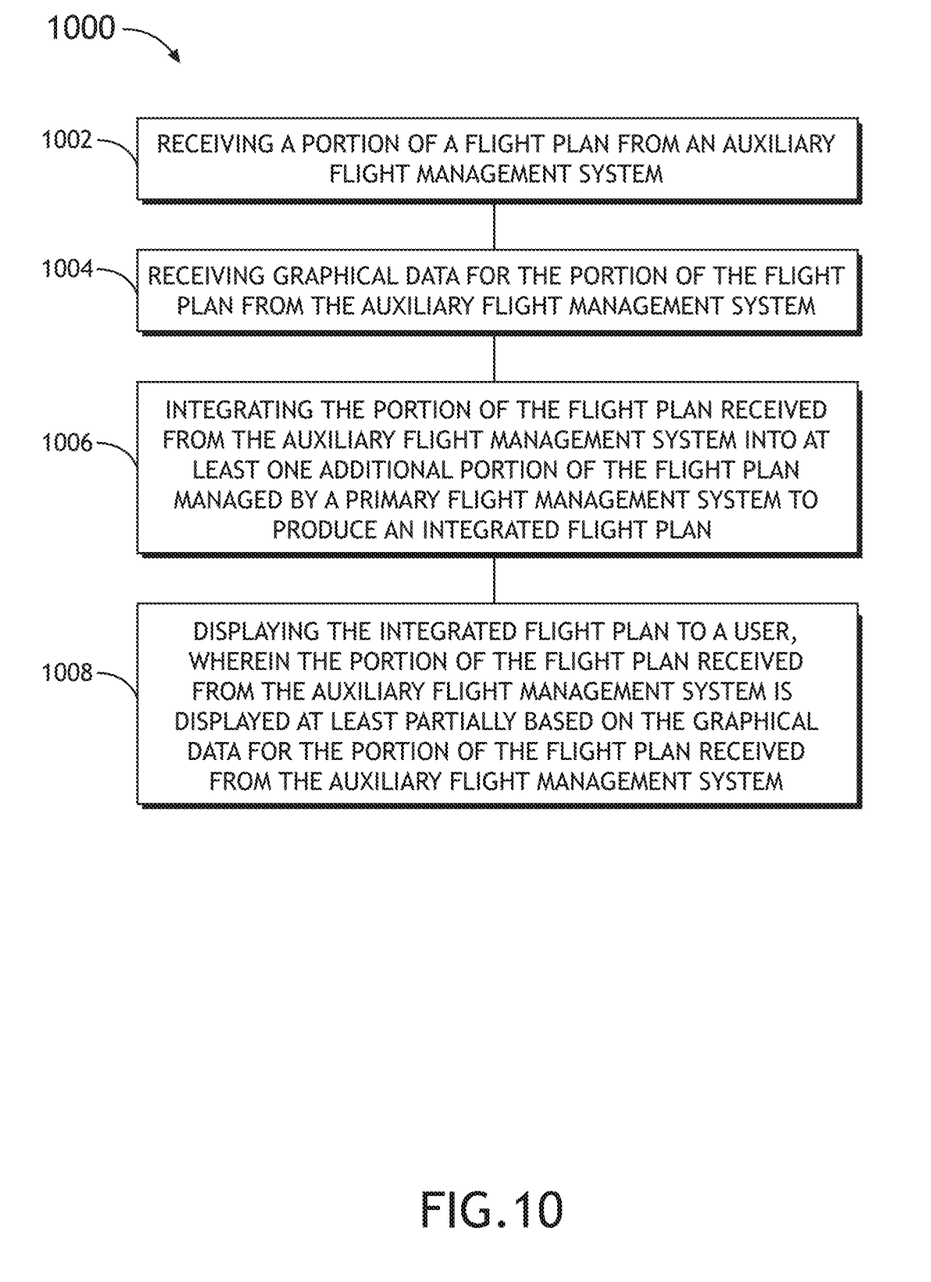
FIG. 10 is a flow diagram depicting a method for providing an integrated user interface.

Referring now to FIG. 10, a flow diagram depicting an embodiment of a method 1000 for providing an integrated user interface is shown. It is contemplated that the method 1000 may be utilized when a primary flight management system delegates certain responsibilities to an auxiliary flight management system, allowing the auxiliary flight management system to generate at least a portion (e.g., one or more legs) of an overall flight plan. In such cases, the primary flight management system may receive the portion of the flight plan generated by the auxiliary flight management system in a step 1002. In addition, the primary flight management system may also receive information associated with the portion of the flight plan from the auxiliary flight management system in a step 1004.

The information associated with the portion of the flight plan generated by the auxiliary flight management system may include graphical data that indicates how to properly display that portion of the flight plan to a user. Accordingly, in a step 1006, the primary flight management system may access information regarding the portion of the flight plan and generate an integrated representation accordingly. The integrated representation may then be displayed in a step 1008.

For instance, in the example previously described in FIG. 2, among the listing of flight legs being presented to the user, one particular leg starting at the leg terminator 108 may be generated by the auxiliary flight management system. The primary flight management system may receive information associated with this particular leg from the auxiliary flight management system, which may also provide instructions (e.g., using tags as previously described) to the primary flight management system with regards to which particular symbol should be associated with the leg terminator 108 on the display. Upon receiving this information, the primary flight management system may follow the instructions provided by the auxiliary flight management system to access a supplemental definition file and select the particular symbol accordingly.

In another example, as previously described in FIG. 6, suppose that the user is viewing a graphical representation of the flight plan, and suppose that one particular portion 408 of the flight plan is generated by the auxiliary flight management system. The primary flight management system may receive information associated with the portion 408 of the flight plan from the auxiliary flight management system, which may include instructions for how to graphically represent the portion 408 of the flight plan (e.g., by specifying a series of waypoints and how these waypoints are connected). Upon receiving this information, the primary flight management system may follow the instructions provided by the auxiliary flight management system and render a graphical representation of the portion 408 of the flight plan along with the rest of the flight plan 410 to the user. It is contemplated that the similar process is applicable to the example depicted in FIG. 9, where instructions for how to graphically represent a simplified preview pattern 708 is received from the auxiliary flight management system. Furthermore, it is contemplated that the integrated user interface provided utilizing the method 1000 may also allow the user to interact with the auxiliary flight management system directly via the integrated graphical user interface, as previously described in FIGS. 7 and 8.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software, firmware, and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
   receiving a portion of a flight plan from an auxiliary flight management system, the portion of the flight plan including a mission-specific flight pattern configured to cover a particular area;
   receiving graphical data for the portion of the flight plan from the auxiliary flight management system;
   integrating the portion of the flight plan received from the auxiliary flight management system into at least one additional portion of the flight plan managed by a primary flight management system, wherein the primary flight management system and the auxiliary flight management system are separate flight management systems, and wherein the portion of the flight plan received from the auxiliary flight management system and the at least one additional portion of the flight plan managed by the primary flight management system are integrated to produce an integrated flight plan; and
   displaying the integrated flight plan to a user, wherein the portion of the flight plan received from the auxiliary flight management system is displayed at least partially based on the graphical data for the portion of the flight plan received from the auxiliary flight management system, wherein the graphical data received from the auxiliary flight management system specifies a supplemental definition file, wherein the primary flight management system is configured to retrieve at least one definition for display of at least one symbol from the supplemental definition file based on the graphical data received from the auxiliary flight management system, and wherein the supplemental definition file is separate from a definition file of the primary flight management system.

2. The method of claim 1, wherein displaying the integrated flight plan to the user further comprises:
   displaying a list of leg terminators in the integrated flight plan to the user, wherein at least one leg terminator of the list of leg terminators is displayed with a particular terminator symbol specified by the auxiliary flight management system.

3. The method of claim 2, wherein the particular terminator symbol to be displayed with the at least one leg terminator is specified in the graphical data received from the auxiliary flight management system.

4. The method of claim 1, wherein the mission-specific flight pattern included in the portion of the flight plan received from the auxiliary flight management system is a search and rescue pattern configured to cover the particular area, and wherein displaying the integrated flight plan to the user further comprises:
   displaying a graphical representation of the integrated flight plan to the user, wherein the portion of the flight plan received from the auxiliary flight management system is rendered graphically based on the graphical data received from the auxiliary flight management system.

5. The method of claim 4, wherein the graphical representation of the integrated flight plan is displayed as a preview to the user prior to execution of the integrated flight plan.

6. The method of claim 5, wherein the graphical representation of the integrated flight plan includes at least:
   a graphical representation of an entry point of the portion of the flight plan received from the auxiliary flight management system;
   a graphical representation of an exit point of the portion of the flight plan received from the auxiliary flight management system; and
   a graphical representation of a number of legs of the portion of the flight plan received from the auxiliary flight management system.

7. The method of claim 4, further comprising:
   receiving a user input via the graphical representation; and
   providing data indicative of the user input to the auxiliary flight management system to update the portion of the flight plan received from the auxiliary flight management system.

8. An apparatus, comprising:
   an application programming interface configured to receive a portion of a flight plan and graphical data for the portion of the flight plan from an auxiliary flight management system, the portion of the flight plan including a mission-specific flight pattern configured to cover a particular area; and
   a processor configured to:
      integrate the portion of the flight plan received from the auxiliary flight management system into at least one additional portion of the flight plan managed by a primary flight management system, wherein the primary flight management system and the auxiliary flight management system are separate flight management systems, and wherein the portion of the flight plan received from the auxiliary flight management system and the at least one additional portion of the flight plan managed by the primary flight management system are integrated to produce an integrated flight plan; and
      provide the integrated flight plan for display to a user, wherein the portion of the flight plan received from the auxiliary flight management system is displayed at least partially based on the graphical data for the portion of the flight plan received from the auxiliary flight management system, wherein the graphical data received from the auxiliary flight management system specifies a supplemental definition file, wherein the primary flight management system is configured to retrieve at least one definition for display of at least one symbol from the supplemental definition file based on the graphical data received from the auxiliary flight management system, and wherein the supplemental definition file is separate from a definition file of the primary flight management system.

9. The apparatus of claim 8, wherein display of the integrated flight plan includes a list of leg terminators in the integrated flight plan, and wherein at least one leg terminator of the list of leg terminators is displayed with a particular terminator symbol specified by the auxiliary flight management system.

10. The apparatus of claim 9, wherein the particular terminator symbol to be displayed with the at least one leg terminator is specified in the graphical data received from the auxiliary flight management system.

11. The apparatus of claim 8, wherein display of the integrated flight plan includes a graphical representation of the integrated flight plan, and wherein the portion of the flight plan received from the auxiliary flight management system is rendered graphically based on the graphical data received from the auxiliary flight management system.

12. The apparatus of claim 11, wherein the graphical representation of the integrated flight plan is displayed as a preview to the user prior to execution of the integrated flight plan.

13. The apparatus of claim 12, wherein the graphical representation of the integrated flight plan includes at least:
- a graphical representation of an entry point of the portion of the flight plan received from the auxiliary flight management system;
- a graphical representation of an exit point of the portion of the flight plan received from the auxiliary flight management system; and
- a graphical representation of a number of legs of the portion of the flight plan received from the auxiliary flight management system.

14. The apparatus of claim 8, wherein the application programming interface is further configured to provide data indicative of a user input to the auxiliary flight management system.

15. A system, comprising:
- a display;
- an auxiliary flight management system; and
- a primary flight management system in communication with the display and the auxiliary flight management system, wherein the primary flight management system and the auxiliary flight management system are separate flight management systems, and the primary flight management system is configured to:
  - receive a portion of a flight plan and graphical data for the portion of the flight plan from the auxiliary flight management system, the portion of the flight plan including a mission-specific flight pattern configured to cover a particular area;
  - integrate the portion of the flight plan received from the auxiliary flight management system into at least one additional portion of the flight plan managed by the primary flight management system to produce an integrated flight plan; and
  - provide the integrated flight plan for display to a user, wherein the portion of the flight plan received from the auxiliary flight management system is displayed at least partially based on the graphical data for the portion of the flight plan received from the auxiliary flight management system, wherein the graphical data received from the auxiliary flight management system specifies a supplemental definition file, wherein the primary flight management system is configured to retrieve at least one definition for display of at least one symbol from the supplemental definition file based on the graphical data received from the auxiliary flight management system, and wherein the supplemental definition file is separate from a definition file of the primary flight management system.

16. The system of claim 15, wherein display of the integrated flight plan includes a list of leg terminators in the integrated flight plan, and wherein at least one leg terminator of the list of leg terminators is displayed with a particular terminator symbol specified by the auxiliary flight management system.

17. The system of claim 16, wherein the particular terminator symbol to be displayed with the at least one leg terminator is specified in the graphical data received from the auxiliary flight management system.

18. The system of claim 15, wherein display of the integrated flight plan includes a graphical representation of the integrated flight plan, and wherein the portion of the flight plan received from the auxiliary flight management system is rendered graphically based on the graphical data received from the auxiliary flight management system.

19. The system of claim 15, wherein the primary flight management system is further configured to provide a user input to the auxiliary flight management system.

* * * * *